US009037770B2

(12) United States Patent
Biran et al.

(10) Patent No.: US 9,037,770 B2
(45) Date of Patent: May 19, 2015

(54) ACCELERATOR ENGINE EMULATION OVER AN INTERCONNECT LINK

(75) Inventors: Giora Biran, Haifa (IL); Ilya Granovsky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 13/101,215

(22) Filed: May 5, 2011

(65) Prior Publication Data

US 2012/0284446 A1    Nov. 8, 2012

(51) Int. Cl.
    *G06F 13/36*    (2006.01)
(52) U.S. Cl.
    CPC ..................... *G06F 13/36* (2013.01)
(58) Field of Classification Search
    USPC .................................................. 710/313, 311
    See application file for complete search history.

(56) References Cited

U.S. PATENT DOCUMENTS

| 6,760,804 | B1 * | 7/2004 | Hunt et al. ..................... 710/313 |
| 7,242,682 | B1 * | 7/2007 | Mueggenberg et al. ...... 370/389 |
| 7,502,884 | B1 * | 3/2009 | Shah et al. ..................... 710/316 |
| 7,552,269 | B2   | 6/2009 | Thurber et al. |
| 7,602,774 | B1 * | 10/2009 | Sundaresan et al. .......... 370/381 |
| 8,041,875 | B1 * | 10/2011 | Shah et al. ..................... 710/316 |
| 2008/0071962 | A1 * | 3/2008 | Yang et al. ..................... 710/313 |
| 2008/0155135 | A1  | 6/2008 | Garg et al. |
| 2008/0222396 | A1  | 9/2008 | Spracklen et al. |
| 2008/0320181 | A1 * | 12/2008 | Lauterbach et al. ............ 710/38 |
| 2009/0083471 | A1  | 3/2009 | Frey et al. |
| 2010/0058031 | A1  | 3/2010 | Aho et al. |
| 2010/0064295 | A1  | 3/2010 | Aho et al. |
| 2010/0161872 | A1 * | 6/2010 | Daniel ........................... 710/316 |
| 2010/0262735 | A1  | 10/2010 | Arimilli et al. |

OTHER PUBLICATIONS

Muiris Woulfe et al., "Programming Models for FPGA Application Accelerators," Trinity College, Dublin, Ireland.
James C. Phillips et al., "Adapting a Message-Driven Parallel Application to GPU-Accelerated Clusters," SC2008, Nov. 2008, Austin, Texas, USA, IEEE.
Jose' Duato et al., Accelerating Computing through Virtualized Remote GPUs.

* cited by examiner

*Primary Examiner* — Nimesh G Patel
(74) *Attorney, Agent, or Firm* — International IP Law Group, PLLC

(57) ABSTRACT

An apparatus and method of emulating a hardware accelerator engine over an interconnect link such as PCI Express (PCIe) link. In one embodiment, the accelerator emulation mechanism is implemented inside a PCIe Host Bridge which is integrated into a host IC or chipset. The accelerator emulation mechanism provides an interface compatible with other integrated accelerators thereby eliminating the overhead of maintaining different programming models for local and remote accelerators. Co-processor requests issued by threads requesting a service (client threads) targeting remote accelerator are queued and sent to a PCIe adapter and remote accelerator engine over a PCIe link. The remote accelerator engine performs the requested processing task, delivers results back to host memory and the PCIe Host Bridge performs co-processor request completion sequence (status update, write to flag, interrupt) include in the co-processor command.

24 Claims, 6 Drawing Sheets

ACCELERATOR ENGINE EMULATION OVER AN INTERCONNECT LINK

FIELD OF THE INVENTION

The present invention relates to the field of data communications, and more particularly relates to an apparatus and method of emulating a hardware accelerator engine over an interconnect link such as PCI Express (PCIe) link.

SUMMARY OF THE INVENTION

There is thus provided in accordance with the invention, a hardware accelerator emulation apparatus, comprising a host bridge operative to emulate a remote hardware accelerator engine as a local integrated hardware accelerator engine, an interconnect link operative to connect said host bridge to said remote hardware accelerator engine, wherein accelerator command requests issued by client threads are sent by said host bridge over said interconnect link to said remote hardware accelerator engine.

There is also provided in accordance with the invention, a hardware accelerator emulation apparatus, comprising an interconnect link, an endpoint adapter port connected to said interconnect link, a hardware accelerator engine in communication with said endpoint adapter port, and wherein accelerator command requests issued by client threads are received over said interconnect link by said endpoint adapter and forwarded to said hardware accelerator engine for execution.

There is further provided in accordance with the invention, a PCIe based hardware accelerator emulation apparatus, comprising a PCIe host bridge operative to emulate a remote hardware accelerator engine as a local integrated hardware accelerator engine, a PCIe endpoint adapter in communication with said PCIe host bridge via a PCIe link, a remote hardware accelerator engine coupled to said PCIe endpoint adapter, and wherein accelerator command requests issued by client threads are sent by said PCIe host bridge to said PCIe endpoint adapter for execution by said remote hardware accelerator engine.

BRIEF DESCRIPTION OF THE DRAWINGS

The invention is herein described, by way of example only, with reference to the accompanying drawings, wherein.

DETAILED DESCRIPTION OF THE INVENTION

Figure 1:
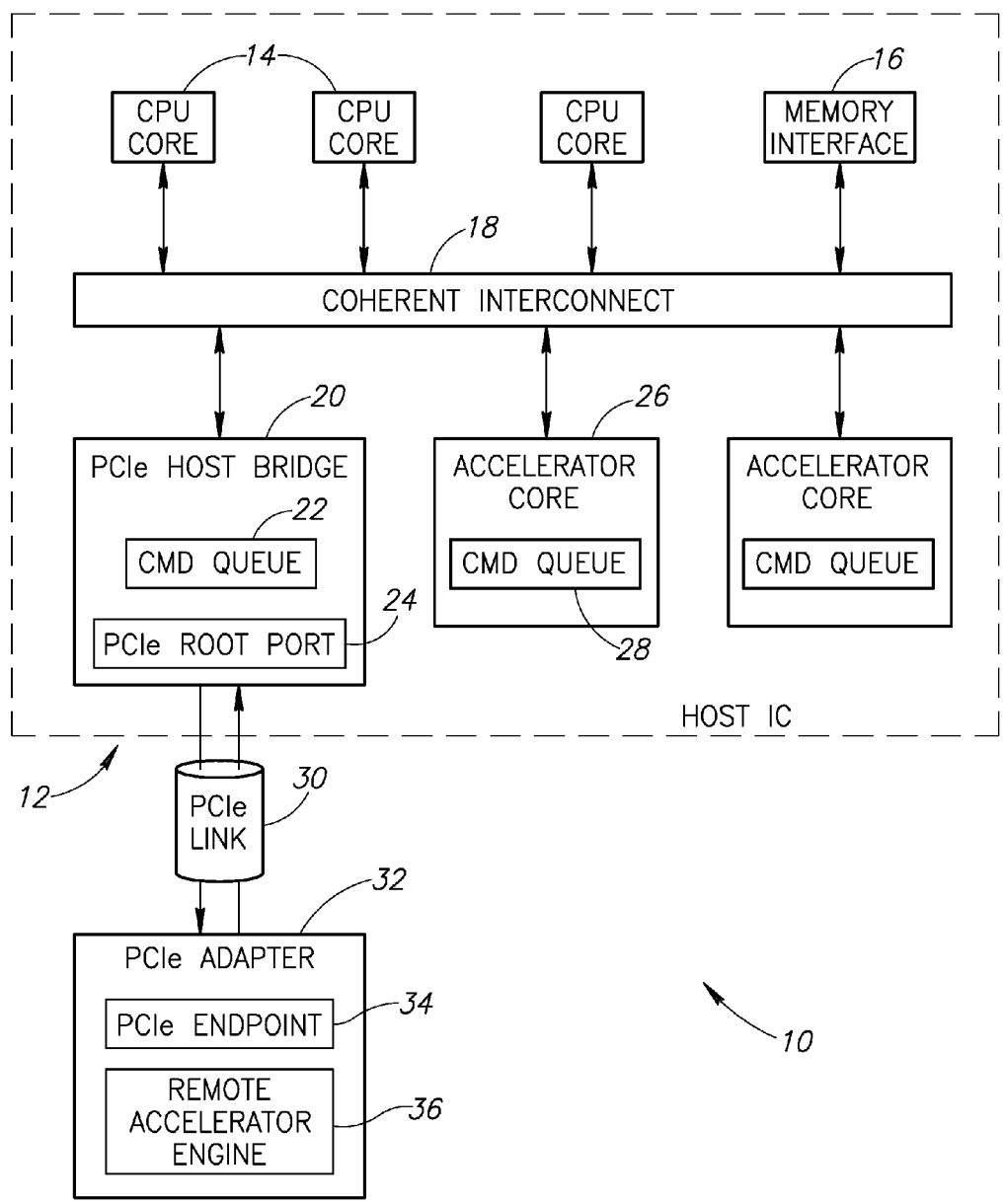
FIG. 1 is a block diagram illustrating an example PCIe attached accelerator emulation mechanism of the present invention.

Processor offload is a commonly used model where various computational tasks may be offloaded from the CPU to a dedicated device optimized for specific tasks execution, typically some type of hardware accelerator. The accelerator core may be integrated together with the processor core on the same device or implemented as a standalone device attached via an interconnect technology such as a PCIe interface. In many applications today, remote PCIe-attached accelerators require a different programming model, due to the different nature of PCIe adapters.

Existing integration trends of multiple general processor cores with optimized task-oriented acceleration hardware allow for a significant increase in computational capacity for parallelized applications. Such architectures are often referred to as hybrid computing architectures. Typically, hardware based accelerator engines are tightly managed by software running on one of the generic processor cores and cannot be utilized without involvement of this management software. The architecture defines dedicated instructions, i.e. co-processor commands, that are used by software to communicate with the one or more hardware acceleration engines.

Many systems today are comprised of multiple devices where application software may run on one device but hardware acceleration engines intended to be used for offloading computations are located on a remote device. A typical system comprises a generic host device and a computation offload device, as described above, attached via an interconnection technology such as a PCIe connection. In such a system, software running on the host cannot access the remote acceleration engine directly and needs to communicate with the management software running on the remote device. Management software issues co-processor requests to the acceleration engine on behalf of the application software running on the host and reports results back to the host application upon completion of the accelerator task. This approach introduces a level of overhead when processing acceleration engine jobs initiated by external devices.

The accelerator emulation mechanism of the present invention is operative to represent a remote PCIe-attached accelerator as a locally integrated accelerator, while retaining a common programming model for both local and remote accelerators. The accelerator emulation mechanism allows software running on a general host processing device to engage remotely located acceleration engines directly without intervention of local management software by submitting accelerator co-processor commands across a communications interconnect such as a PCIe link.

In one embodiment, PCIe attached accelerators are part of the system structure and architecture. Alternatively, they can serve as a vehicle for prototyping new types of accelerators which can later be integrated into the general processor chip.

PCI Express was originally designed for desktops connecting a root complex (a host central processing unit (CPU) with memory) with downstream Input/Output (IO) devices, but has since found applications in servers, storage devices, and other communications systems. The base PCIe switching structure of a single root complex has a tree topology, which addresses PCIe endpoints through a bus numbering scheme.

A block diagram illustrating an example PCIe attached accelerator emulation mechanism of the present invention is shown in FIG. 1. The system, generally referenced 10, comprises a host IC 12 in communication with a PCIe adapter 32 via a PCIe link 30. The host IC 12 comprises a plurality of general purpose CPU cores 14, memory and associated interface 16, one or more local accelerator cores 26 having a command queue 28, a PCIe host bridge 20 incorporating a command queue 22 and PCIe root port 24. The CPU cores, memory, local accelerator cores and PCIe host bridge communicate over coherent interconnect 18.

In one embodiment, the accelerator emulation mechanism is implemented inside a PCIe Host Bridge 20 which is integrated into the host IC or chipset. The accelerator emulation mechanism provides an interface compatible with other integrated accelerators thereby eliminating the overhead of maintaining different programming models for local and remote accelerators.

In an example embodiment, the accelerator emulation mechanism implements dedicated hardware (or software or a combination of hardware and software) that implements the following tasks. Co-processor requests issued by threads requesting a service (client threads) targeting remote accelerator are queued. The PCIe Host Bridge provides commands flow control similar to conventional hardware accelerators. Co-processor commands are sent across the PCIe link 20 to the remote device (i.e. PCIe adapter endpoint) using PCIe posted write transactions. The remote accelerator engine pulls the required data from host memory, performs the requested processing task and delivers results back to host memory. The remote accelerator engine notifies the PCIe Host Bridge upon task completion. The PCIe Host Bridge performs co-processor request completion sequence (status update, write to flag, interrupt). In one embodiment, the mechanism utilizes co-processor requests defined by the Power Architecture for interfacing hardware accelerator engines.

Figure 2:
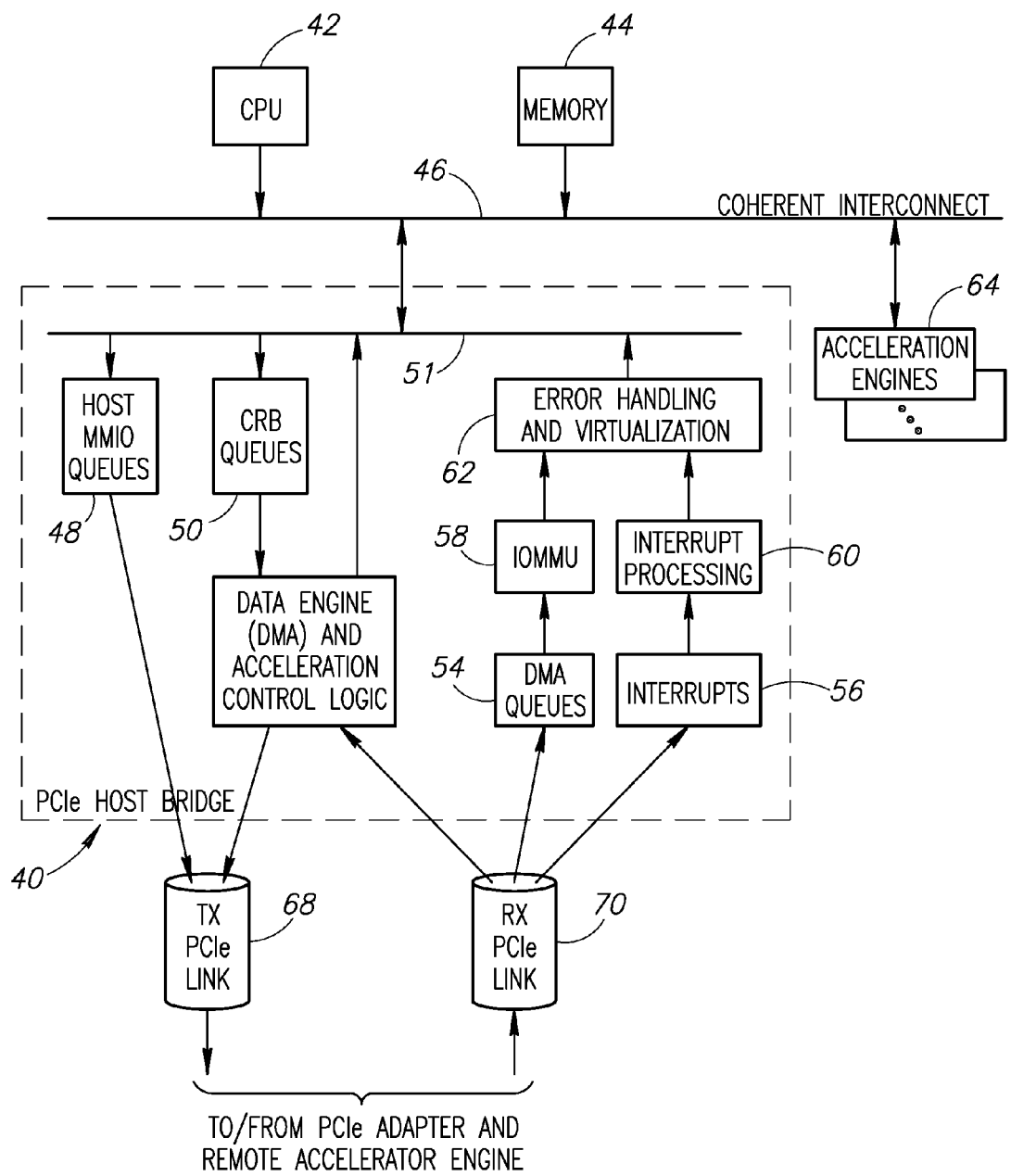
FIG. 2 is a block diagram illustrating the example PCIe host bridge of FIG. 1 with PCIe port modifications in more detail in accordance with the accelerator emulation mechanism of the present invention.

A block diagram illustrating the example PCIe host bridge of FIG. 1 with PCIe port modifications in more detail in accordance with the accelerator emulation mechanism of the present invention is shown in FIG. 2. The PCIe host bridge 40 comprises bus 51, host MMIO queues 48, CRB queues 50, data engine (direct memory access (DMA)) and acceleration control logic 52, DMA queues 54, interrupts 56, I/O memory mapping unit (IOMMU) 58 (hardware located in the host used to translate addresses of DMA transactions issued by the adapter), interrupt processing 60 and error handling and virtualization 62. The host bridge communicates with one or more general purpose CPU cores 42, memory 44 and one or more local accelerator engines 64 over coherent interconnect 46.

In operation, co-processor commands generated by the CPU cores are sent across the TX PCIe link 68 to the PCIe adapter and remote accelerator engine. Results of the execution of the co-processor commands are returned to the PCIe host bridge via RX PCIe link 70.

Figure 3:
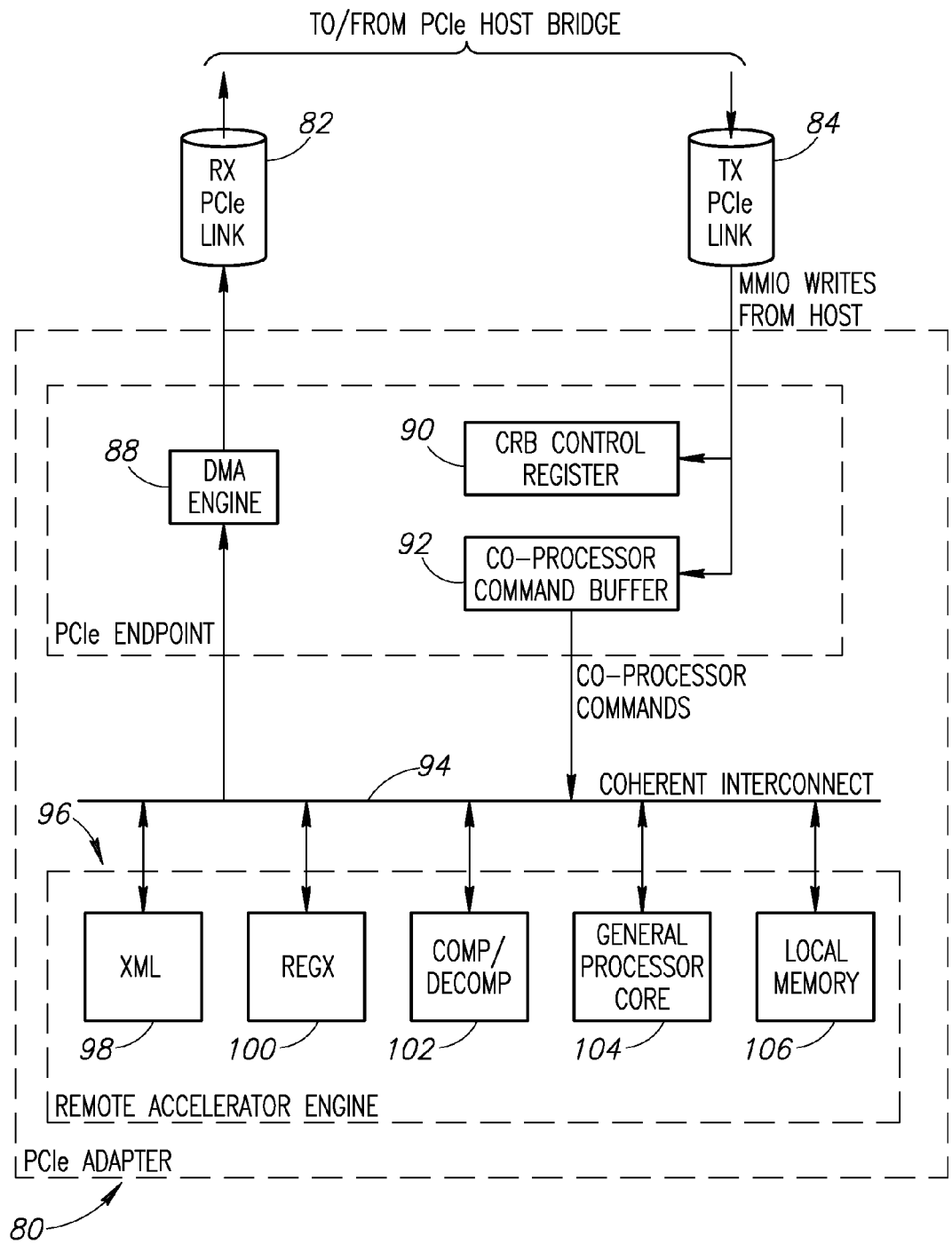
FIG. 3 is a block diagram illustrating the example PCIe adapter port of FIG. 1 in more detail in accordance with the accelerator emulation mechanism of the present invention.

A block diagram illustrating the example PCIe adapter port of FIG. 1 in more detail in accordance with the accelerator emulation mechanism of the present invention is shown in FIG. 3. The PCIe adapter, generally referenced 80, comprises PCIe endpoint 86 and remote accelerator engine 96 in communication via coherent interconnect bus 94. The PCIe endpoint comprises DMA engine 88, Co-Processor Request Block (CRB) control register 90 and co-processor command buffer 92. Note that in one example embodiment, the CRB comprises a 64B data structure that contains commands for a co-processor (or accelerator). The remote accelerator engine 96 comprises one or more co-processors (hardware accelerators). In the example embodiment shown, the remote accelerator engine comprises XML accelerator 98, regular expression accelerator 100, compression/decompression accelerator 102, general processor core 104 and local memory 106 all coupled to the coherent interconnect bus 94.

In operation, co-processor commands from the PCIe host bridge are received via MMIO writes from the host via TX PCIe link 84. Co-processor command completion results are sent back to the host bridge via RX PCIe link 82.

In one embodiment, the accelerator emulation mechanism comprises dedicated hardware implemented in the PCIe endpoint port logic that imitates management software behavior when issuing co-processor commands towards different remote acceleration engines. This hardware is assigned with software thread identifications, such as unique process ID (PID) and Logical Partition ID (LPID) numbers, that are used when issuing co-processor commands on its behalf. Note that a combination of LPID/PID identifies software thread running in the system.

PCIe endpoint port logic comprises one or more local command buffers 92 (e.g., 64 bytes each) accessible by the host via the PCIe link interface 84. Host software running on the PCIe host bridge delivers the content of a co-processor command to the local buffer located in the PCIe adapter port and then triggers command execution by setting a control bit in a PCIe-mapped control register 90. The PCIe adapter port hardware generates co-processor commands based on local buffer content and locally assigned thread attributes and submits this command to local processor bus interconnect 94 for execution by the remote accelerator engine, as if this command was created by a software thread running on one of general processor cores of the host IC device.

In one embodiment, a co-processor command completion method of memory writes mapped back to PCIe upstream interface is used to signal command completion to the host IC. Additionally, the PCIe host bridge may use co-processor commands for engaging the PCIe adapter's DMA engine 88 for source and results data transfer between host and adapter local memory.

Figure 4:
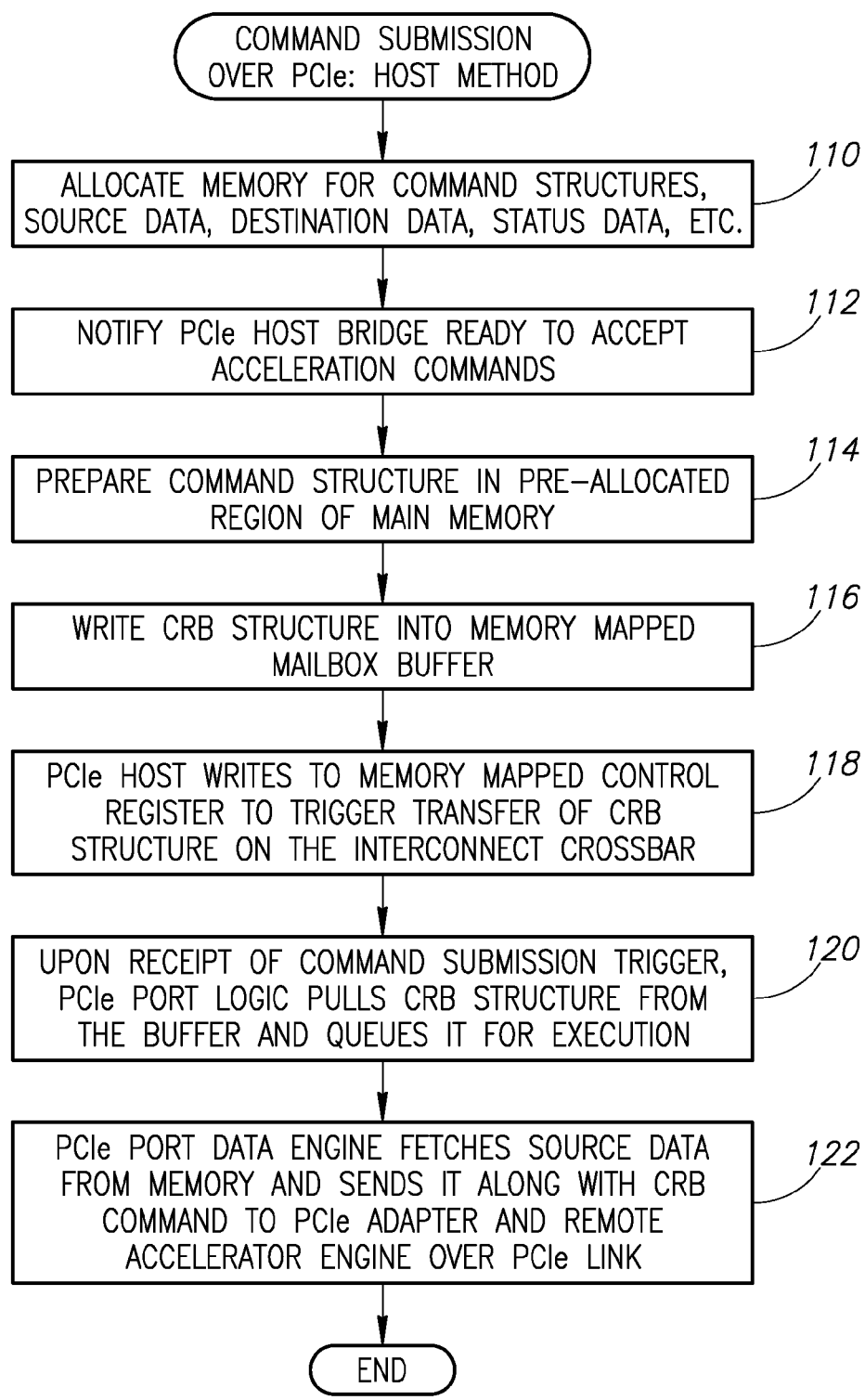
FIG. 4 is a flow diagram illustrating the host bridge side command submission method of the present invention.

A flow diagram illustrating the host bridge side command submission method of the present invention is shown in FIG. 4. This host based method normally executes on the host IC side. Software on the host IC allocates memory for command structures, source data, destination data, status data, etc. in main memory (step 110). Local software on the host IC notifies the PCIe host bridge (via interrupt, predefined share memory buffer or other mechanism) that it is ready to accept acceleration commands (step 112). Software on the host IC prepares the command structure for a co-processor command in the pre-allocated region of the main memory (step 114). Software running on the PCIe host bridge delivers source data to local memory (using direct PCIe memory writes or by engaging local DMA engine).

Software running on the PCIe host bridge writes the CRB structure into a memory-mapped mailbox buffer (using regular PCIe memory write PCI Express Transaction Layer Packet (TLPs) used to convey application data over a PCIe link) (step 116). When a command structure is ready, software issues accelerator command that triggers transfer of CRB structure on the interconnect crossbar (step 118). The PCIe host bridge writes to memory-mapped control register to trigger command submission.

When command submission trigger received, PCIe port logic pulls the CRB structure from the command buffer and delivers it to the crossbar interconnect. PCIe port logic receives co-processor commands from the interconnect crossbar and queues it for execution (step 120). The PCIe port data engine fetches source data from memory and sends it to acceleration engine over the TX PCIe link to the target accelerator engine (step 122).

Figure 5:
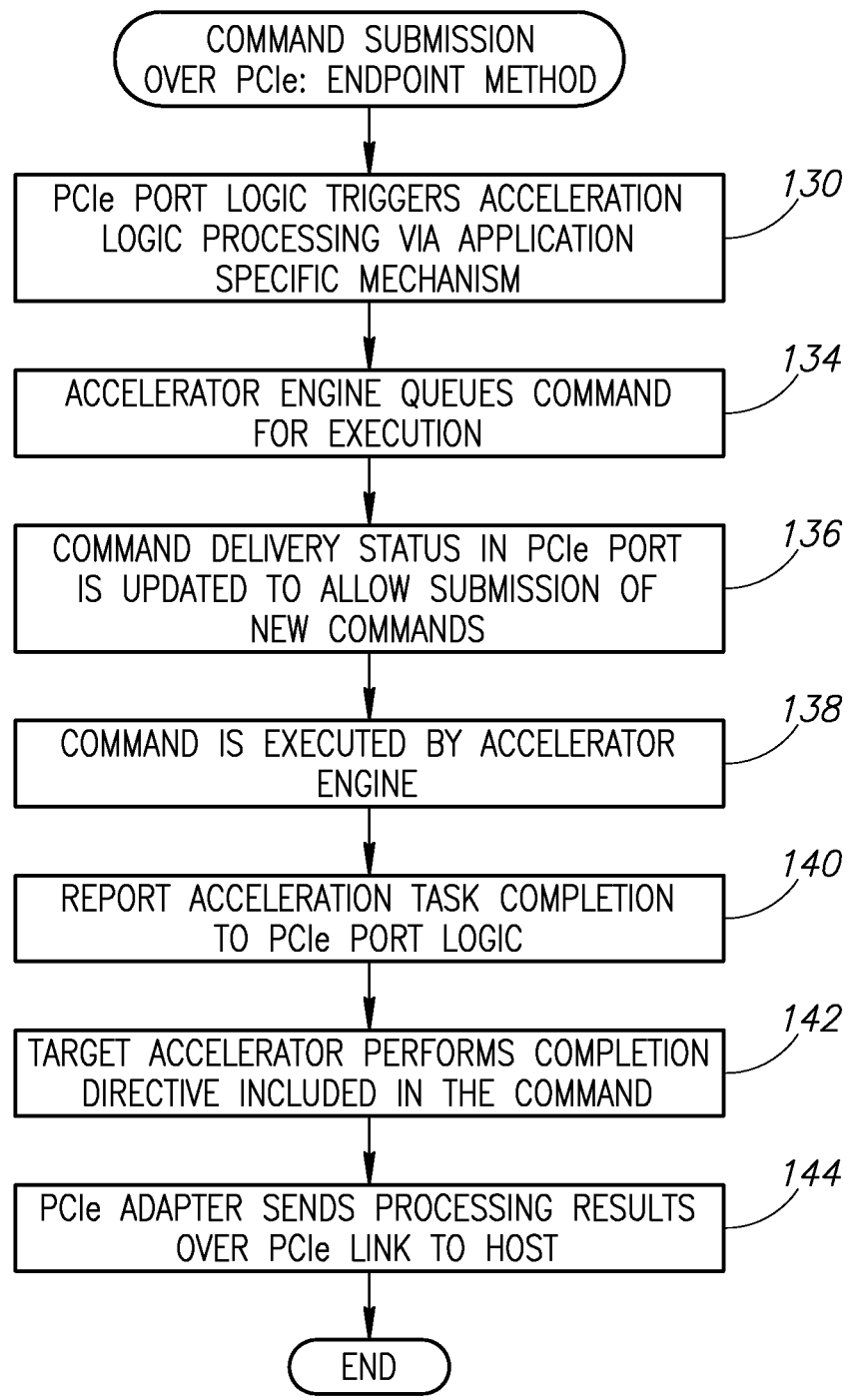
FIG. 5 is a flow diagram illustrating the adapter port side command submission method of the present invention.

A flow diagram illustrating the adapter port side command submission method of the present invention is shown in FIG. 5. The PCIe adapter endpoint receives the co-processor command over the PCIe link. PCIe adapter endpoint port logic triggers acceleration logic processing via application specific mechanism (e.g., by writing to the control register) (step 130). The remote accelerator engine then queues the co-processor command for execution (step 134). Command delivery status in the PCIe adapter endpoint port is updated, allowing submission of new co-processor commands (step 136). The co-processor command is executed by the remote accelerator engine (step 138).

When the target accelerator engine completes command execution, the acceleration logic reports acceleration task completion to PCIe adapter port logic (step 140). PCIe adapter port logic then executes any completion directive included in the original co-processor command (step 142). This directive may specify sending an interrupt back to the PCIe host bridge over the PCIe link indicating command completion to host IC software or writing to a reserved location being monitored by host IC software (step 144). Software running on the PCIe host bridge retrieves processing results (e.g., using direct PCIe memory reads or by engaging local DMA engine) and may take further action based on the results.

Figure 6:
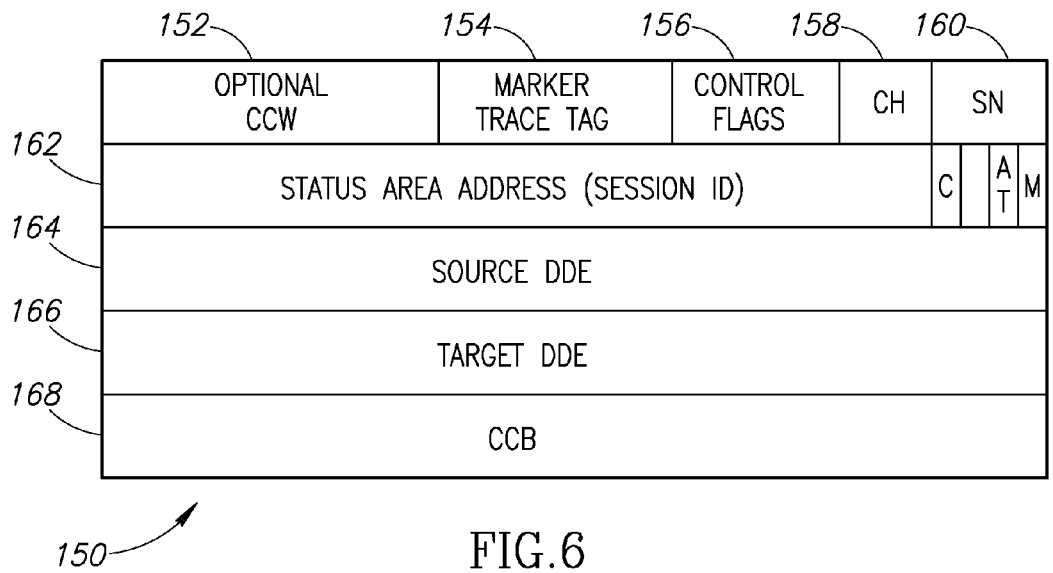
FIG. 6 is a diagram illustrating an example accelerator command structure.

A diagram illustrating an example accelerator command structure is shown in FIG. 6. The command structure, generally referenced 150, comprising 64 bytes, comprises an optional CCW field 152, marker trace tag 154, control flags 156, CH field 158, SN field 160, status area address (session ID) field 162, source Data Descriptor Entry (DDE) 164, destination DDE 166 and Co-processor Completion Block (CCB) 168. In one example embodiment, the DDE comprises a 16B data structure identifying the data range in the memory (i.e. starting address and size). DDEs are included in a CRB to specify source and destination data ranges for co-processor commands. In one example embodiment, the CCB comprises a 16B data structure identifying the method of co-processor notification. The CCB is also included in a CRB to specify the method for notification of co-processor command execution completion.

In an example embodiment, the command structure 150 can be used as a data transfer command (DMA), Regular Expression Pattern Matching engine command, encryption/decryption engine command, compression/decompression engine command, etc.

The Session ID represents the commands stream identifier (acceleration engine supports several concurrent streams). The Source DDE represents the source data descriptor and specifies memory location and total size of source data. The target DDE represents the destination data descriptor, specifies memory location where results of accelerator engine processing should be stored. The CCB field represents a completion directive, specifies notification method(s) of command completion (e.g., memory writes to predefined location, interrupt, etc.)

Figure 7:
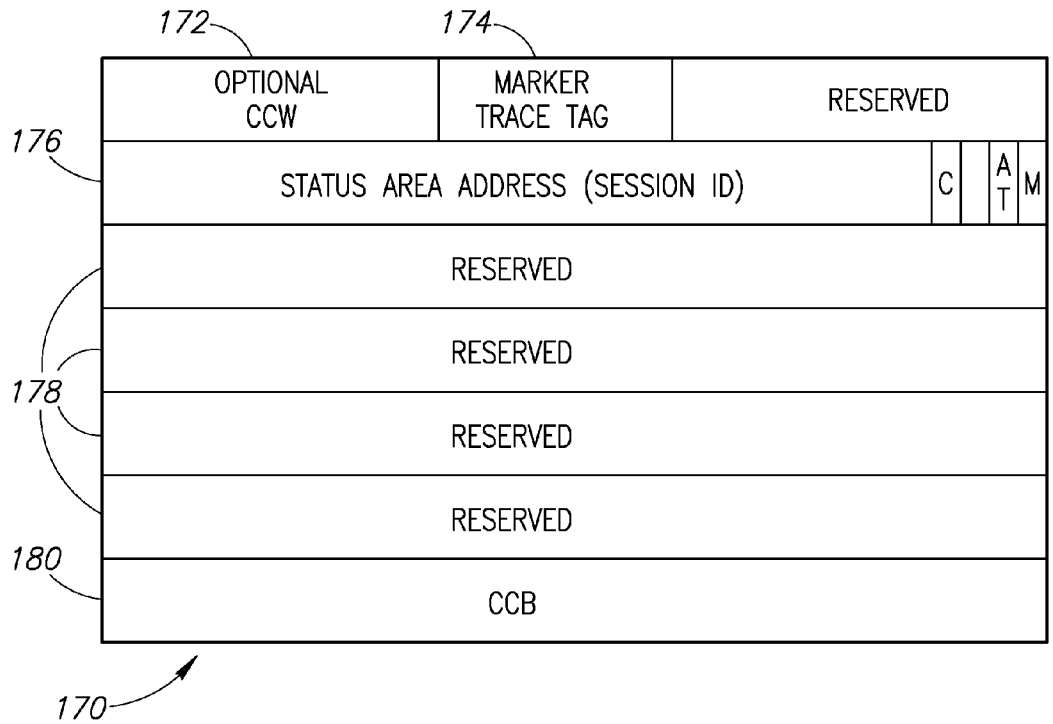
FIG. 7 is a diagram illustrating an example synchronization command.

A diagram illustrating an example synchronization command is shown in FIG. 7. The example synchronization command, generally referenced 170, comprises an optional CCW field 172, marker trace tag 174, status area address (session ID) 176, a plurality of reserved fields 178 and CCB field 180.

In operation, the synchronization command when completed indicates that all previously issued commands have completed. It is sent from the PCIe adapter to the PCIe host bridge in the host IC.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A hardware accelerator emulation apparatus for use in connecting a remote hardware accelerator with one or more general purpose host processing cores, comprising:
    a host bridge operative to emulate a remote hardware accelerator engine as a local integrated hardware accelerator engine;
    an interconnect link operative to connect said host bridge to said remote hardware accelerator engine;
    wherein accelerator command requests issued by client threads running on said one or more general purpose host processing cores are sent by said host bridge over said interconnect link to endpoint port logic coupled to said remote hardware accelerator engine;
    wherein said endpoint port logic generates and submits co-processor commands for execution by the remote accelerator engine as if the commands were created by a software thread running on one of said general processor cores of the host device, the co-processor commands based at least in part on local buffer content and a locally assigned thread attribute; and
    wherein said remote hardware accelerator engine effectively appears as a locally integrated accelerator to host processing cores connected to said host bridge thereby enabling a common programming model for both local and remote hardware accelerators.

2. The apparatus according to claim 1, wherein said host bridge comprises a queue operative to store co-processor requests received from a client.

3. The apparatus according to claim 1, wherein said host bridge comprises a data engine.

4. The apparatus according to claim 1, wherein said host bridge comprises accelerator control logic.

5. The apparatus according to claim 1, wherein said interconnect comprises a PCIe link.

6. The apparatus according to claim 1, wherein said host bridge comprises a PCIe port operative to transmit co-processor requests from a command queue over a PCIe link to said remote hardware accelerator engine.

7. The apparatus according to claim 1, wherein said host bridge comprises a PCIe port operative to receive co-processor request task completion results from said remote hardware accelerator engine.

8. The apparatus according to claim 1, wherein said host bridge comprises a PCIe host bridge operative to perform a co-processor request completion sequence in response to execution completion of a command request by said remote hardware accelerator engine.

9. The apparatus according to claim 1, wherein said host bridge further comprises flow control means for controlling communications between said host bridge and said remote hardware accelerator engine.

10. The apparatus according to claim 1, wherein said co-processor commands are transmitted across a PCIe interconnect link to said remote hardware accelerator engine utilizing PCIe posted write transactions.

11. A hardware accelerator emulation apparatus for use in connecting a remote hardware accelerator with one or more general purpose host processing cores, comprising:
an interconnect link operative to connect a host bridge to said remote hardware accelerator;
an endpoint adapter port connected to said interconnect link;
said remote hardware accelerator engine in communication with said endpoint adapter port;
wherein accelerator command requests issued by client threads running on said one or more general purpose host processing cores are received over said interconnect link from said host bridge by said endpoint adapter and forwarded to said hardware accelerator engine for execution;
wherein said endpoint port logic generates and submits co-processor commands for execution by the remote accelerator engine as if the commands were created by a software thread running on one of said general processor cores of the host device, the co-processor commands based at least in part on local buffer content and a locally assigned thread attribute; and
wherein said remote hardware accelerator engine effectively appears as a locally integrated accelerator to host processing cores connected to said host bridge thereby enabling a common programming model for both local and remote hardware accelerators.

12. The apparatus according to claim 11, wherein said interconnect link comprises a PCIe link.

13. The apparatus according to claim 11, wherein said endpoint adapter comprises a PCIe endpoint adapter.

14. The apparatus according to claim 11, wherein said hardware accelerator engine is operative to retrieve data required to execute said command requests from host memory.

15. The apparatus according to claim 11, wherein said hardware accelerator engine is operative to perform requested processing task in accordance with said command request and send processing results back to host memory.

16. The apparatus according to claim 11, wherein said hardware accelerator engine is operative to notify a PCIe host bridge via a PCIe interconnect link upon command request execution completion.

17. The apparatus according to claim 11, wherein said endpoint adapter port comprises a DMA engine.

18. The apparatus according to claim 11, wherein said endpoint adapter port comprises a co-processor command buffer.

19. The apparatus according to claim 11, wherein said endpoint adapter port comprises a control register.

20. A PCIe based hardware accelerator emulation apparatus for use in connecting a remote hardware accelerator with one or more general purpose host processing cores, comprising:
a PCIe host bridge operative to emulate a remote hardware accelerator engine as a local integrated hardware accelerator engine;
a PCIe endpoint adapter in communication with said PCIe host bridge via a PCIe link; a remote hardware accelerator engine coupled to said PCIe endpoint adapter;
wherein accelerator command requests issued by client threads running on said one or more general purpose host processing cores are sent by said PCIe host bridge to said PCIe endpoint adapter for execution by said remote hardware accelerator engine;
wherein said PCIe endpoint port logic generates co-processor commands based on local buffer content and locally assigned thread attributes and submits said commands a local processor bus interface for execution by the remote accelerator engine as if the commands were created by a software thread running on one of said general processor cores of the host device; and
wherein said remote hardware accelerator engine effectively appears as a locally integrated accelerator to host processing cores connected to said PCIe host bridge thereby enabling a common programming model for both local and remote hardware accelerators.

21. The apparatus according to claim 20, wherein said co-processor requests are issued by one or more client threads requesting service targeting said remote hardware accelerator engine.

22. The apparatus according to claim 20, wherein said remote hardware accelerator engine effectively appears as a locally integrated dedicated accelerator integrated into CPU core processors connected to said PCIe host bridge.

23. The apparatus according to claim 20, wherein said PCIe host bridge provides command flow control in a similar manner as conventional hardware accelerators.

24. The apparatus according to claim 20, wherein said host bridge comprises a PCIe host bridge operative to perform a co-processor request completion sequence in response to execution completion of a command request by said remote hardware accelerator engine.

* * * * *